(12) United States Patent
Bourgault

(10) Patent No.: US 9,288,968 B2
(45) Date of Patent: Mar. 22, 2016

(54) SALT LICK BLOCK SUPPORT INCORPORATING A LIQUID CONTAINER THEREIN

(71) Applicant: Serge Bourgault, Beaulac-Garthby (CA)

(72) Inventor: Serge Bourgault, Beaulac-Garthby (CA)

( * ) Notice: Subject to any disclaimer, the term of this patent is extended or adjusted under 35 U.S.C. 154(b) by 9 days.

(21) Appl. No.: 14/261,425

(22) Filed: Apr. 25, 2014

(65) Prior Publication Data

US 2015/0305300 A1 Oct. 29, 2015

(51) Int. Cl.
*A01K 5/015* (2006.01)
*A23K 1/175* (2006.01)

(52) U.S. Cl.
CPC ............. *A01K 5/015* (2013.01); *A23K 1/175* (2013.01)

(58) Field of Classification Search
CPC .......... A01G 9/00; A01G 9/02; A01G 9/021; A01K 5/015; A23K 1/175
USPC .............. 47/32.7, 32.4, 32.6, 32.8; 119/51.03
See application file for complete search history.

(56) References Cited

U.S. PATENT DOCUMENTS

| 518,819 | A | * | 4/1894 | Lee | A01K 5/015 |
| | | | | | 119/51.03 |
| 590,458 | A | | 9/1897 | Lee | |
| 872,818 | A | | 12/1907 | Hutcheson | |
| 2,142,825 | A | | 1/1939 | Patton | |
| 2,203,275 | A | * | 6/1940 | Beyea | A01K 5/015 |
| | | | | | 119/51.03 |
| 2,661,719 | A | | 12/1953 | Scheidt et al. | |
| 2,833,247 | A | * | 5/1958 | Beyea | A01K 5/015 |
| | | | | | 119/51.03 |
| 2,908,250 | A | | 10/1959 | Aniser | |
| 3,415,011 | A | * | 12/1968 | Hornbostel, Jr. | A01G 9/02 |
| | | | | | 2/171.1 |
| 4,793,289 | A | | 12/1988 | Peeso | |
| D429,388 | S | | 8/2000 | Irving | |
| 6,536,158 | B2 | * | 3/2003 | Rice | A01G 13/0281 |
| | | | | | 47/32.4 |
| 6,966,145 | B1 | * | 11/2005 | Taft | A01M 13/003 |
| | | | | | 43/107 |
| 7,481,180 | B1 | | 1/2009 | Snipes | |
| 8,146,533 | B2 | | 4/2012 | Beltezore et al. | |

FOREIGN PATENT DOCUMENTS

| AT | 377159 | 2/1985 |
| GB | 679222 | 9/1952 |

* cited by examiner

*Primary Examiner* — Kristen C Hayes
*Assistant Examiner* — Ebony Evans

(57) ABSTRACT

A salt lick block support incorporating a liquid container therein has a main body member having a hole in a top surface thereof. A hollow central portion adapted to hold a granular material therein, and a base portion extending outwardly from a lower section thereof and including a plurality of holes therethrough adapted to allow fasteners therein to securely hold the salt lick block support to a chosen surface. A plurality of fasteners adapted to extend through respective of the plurality of holes and engage the chosen surface. A removable container adapted to hold a liquid therein, has an opening in a top portion thereof, and is adapted to fit and be held in place within the hole in the top surface of the main body member, wherein the removable container further includes a small aperture in a bottom surface thereof that is adapted to allow the liquid to pass therethrough in a drop-by-drop fashion.

7 Claims, 8 Drawing Sheets

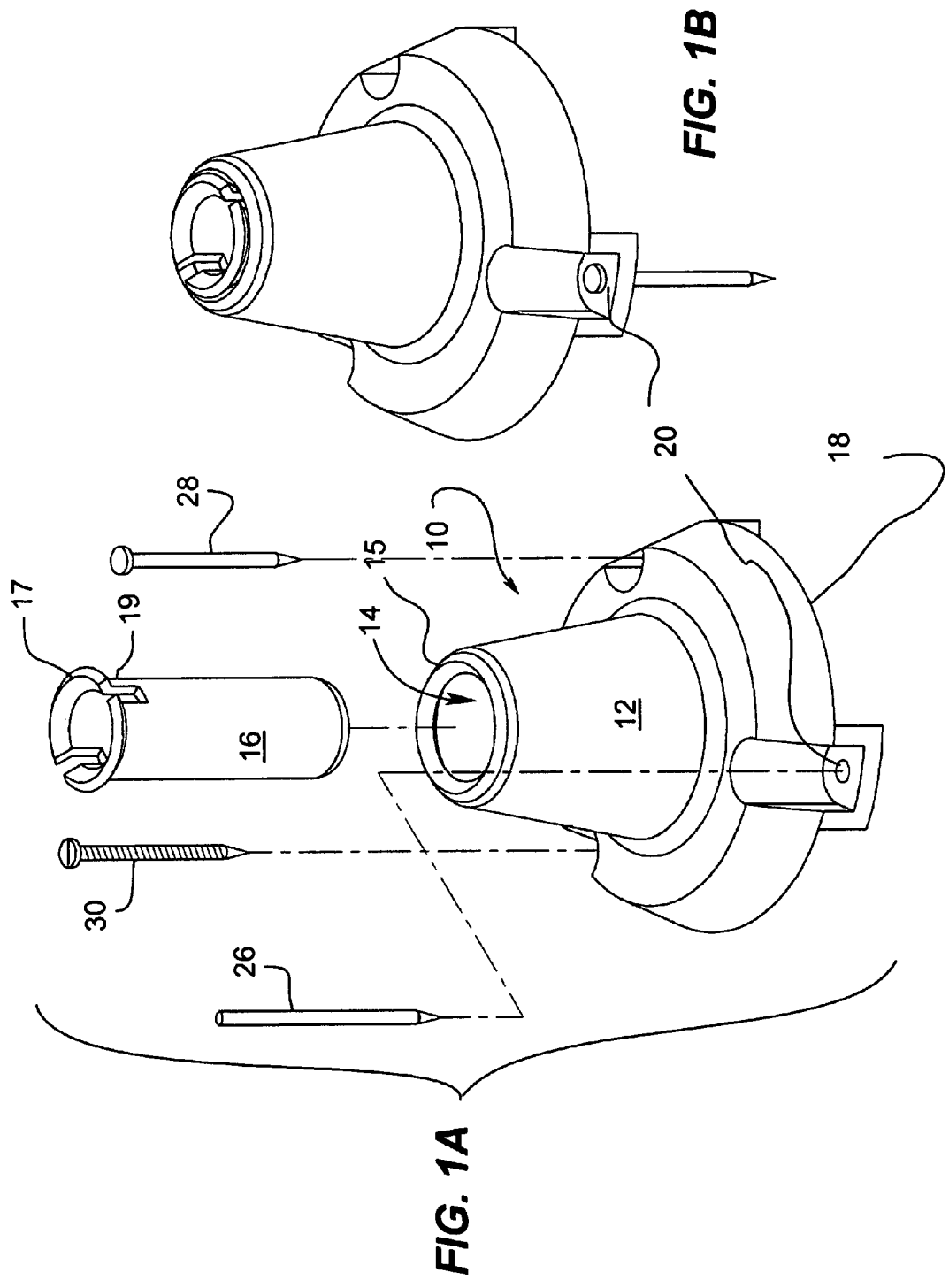

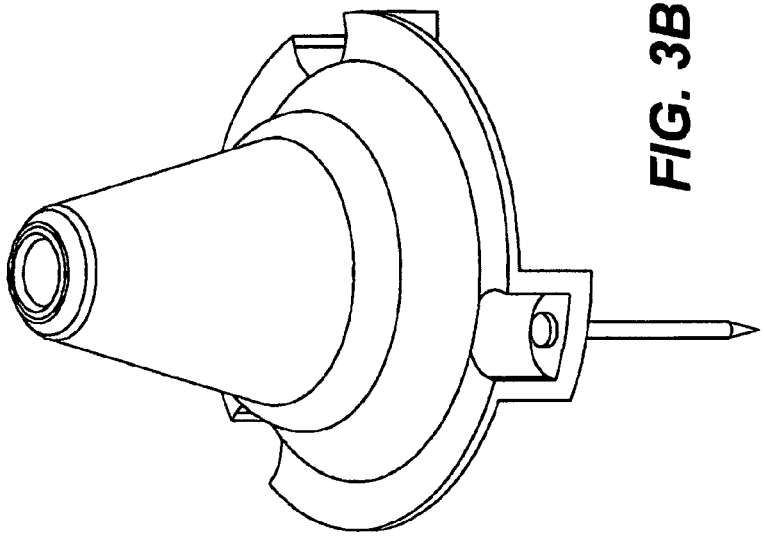
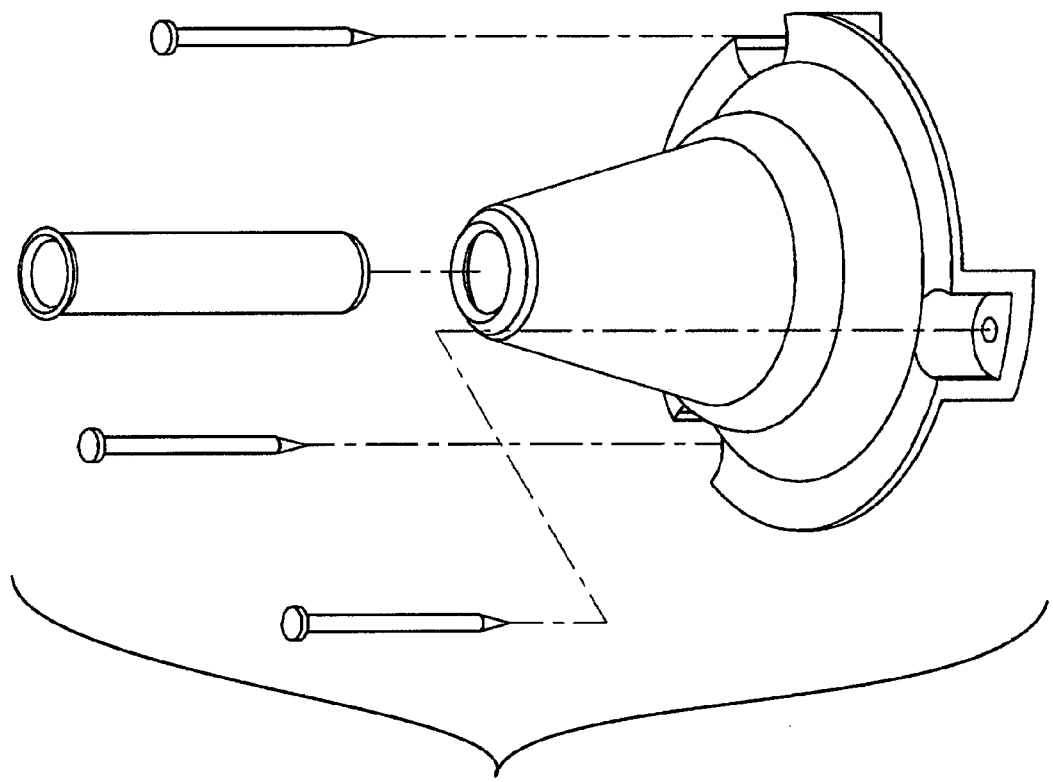

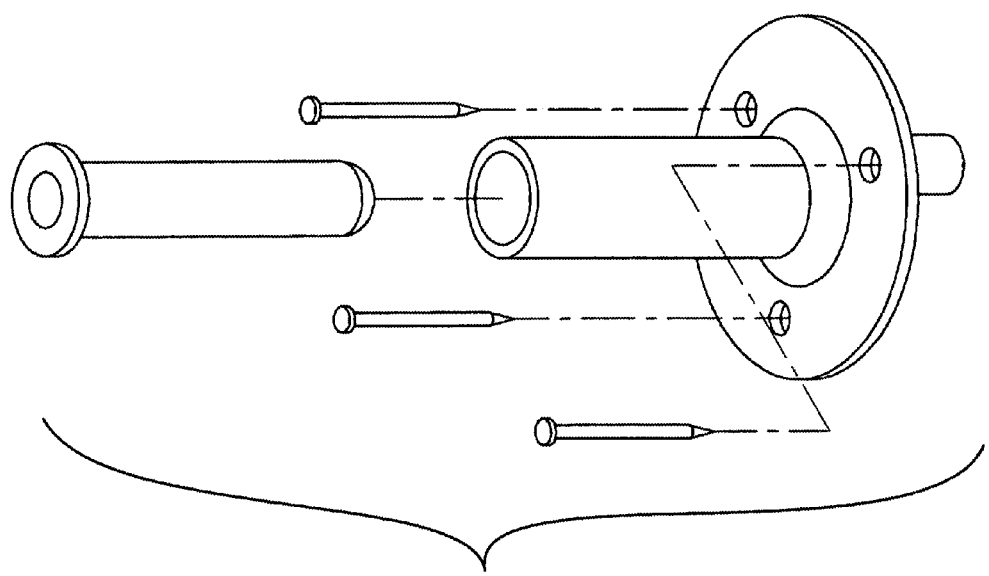
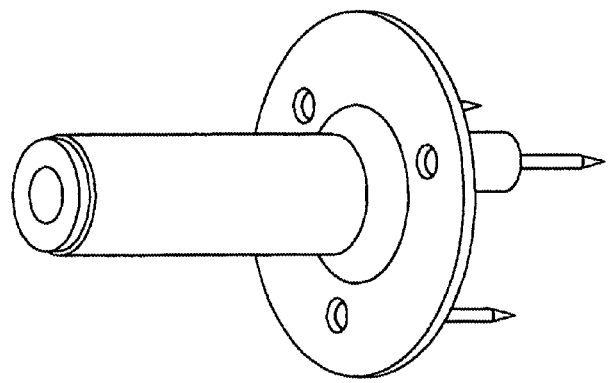
FIG. 7A
FIG. 7B

SALT LICK BLOCK SUPPORT INCORPORATING A LIQUID CONTAINER THEREIN

This application claims priority based on request GB1308989.1 filed May 17, 2013

FIELD OF THE INVENTION

The present invention relates generally to hunting equipment but more particularly to a salt lick block support incorporating a liquid container therein for putting a liquid based bait.

BACKGROUND OF THE INVENTION

In order to bait game, hunters often use salt lick blocks. Preferably, these salt lick blocks should be securely attached so that they remain at a known location. Although animals return to the salt lick block when they have found it, the problem is that it can take a while to find it in the first place so that a habit is created. There is therefore a need for a way to help game find the salt lick block in the first place.

SUMMARY OF THE INVENTION

In view of the foregoing disadvantages inherent in the known devices now present in the prior art, the present invention, which will be described subsequently in greater detail, is to provide objects and advantages which are:

To provide for a for a salt lick block base which can be secured to a fallen tree or tree stump and that also contains a container which is designed to contain a smelly substance which attracts game to it.

In order to do so, the invention comprises a main body member having a hole in a top surface thereof. A hollow central portion adapted to hold a granular material therein, and a base portion extending outwardly from a lower section thereof and including a plurality of holes therethrough adapted to allow fasteners therein to securely hold the salt lick block support to a chosen surface. A plurality of fasteners adapted to extend through respective of the plurality of holes and engage the chosen surface. A removable container adapted to hold a liquid therein, has an opening in a top portion thereof, and is adapted to fit and be held in place within the hole in the top surface of the main body member, wherein the removable container further includes a small aperture in a bottom surface thereof that is adapted to allow the liquid to pass therethrough in a drop-by-drop fashion.

In one preferred embodiment, the main body member and the hollow central portion are formed in a conical shape.

The hole in the top surface of the main body member is formed in a circular shape; and wherein the removable container is formed in the shape of an elongated cylinder.

The removable container further contains an upper rim extending outwardly from a top portion thereof and is adapted to engage a top surface rim of the top surface of the main body member, such that the removable container is held in place therein.

A liquid is placed within the removable container and the liquid is chosen from a group of liquids that have an odor that is adapted to attract animals.

A granular material adapted to be placed within the hollow central portion of the main body member chosen from a group of granular materials that have an odor that is adapted to attract animals.

A sponge member adapted to be placed within the hollow central portion of the main body member wherein the sponge member contains a liquid substance therein having an odor that is adapted to attract animals.

The plurality of fasteners are chosen from a group of fasteners comprising nails, screws, and stakes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 1a-b Exploded and isometric views of the invention.

FIGS. 3a-b Exploded and isometric views of an alternate embodiment.

FIGS. 7a-b Exploded and isometric views of still another embodiment.

DETAILED DESCRIPTION OF THE PREFERRED EMBODIMENT

Figure 2A:
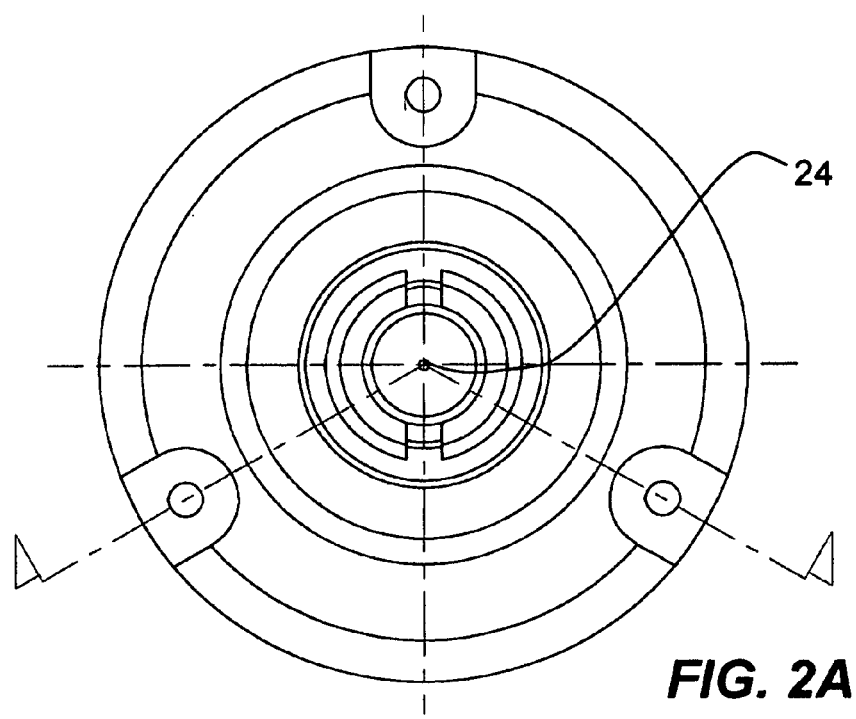
FIGS. 2a-b Top and cutaway views of the invention.
Figure 2B:
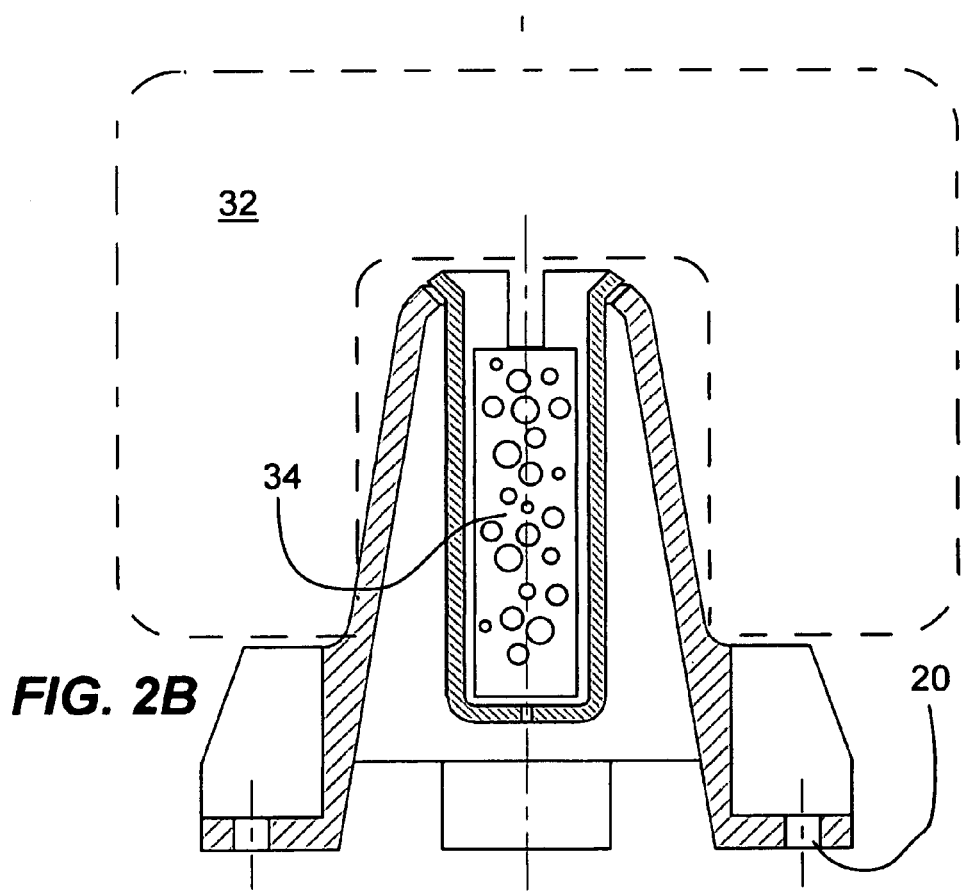

A salt lick block support (10) has a main body member (12) having a hollow center portion (14) in a top surface (15) thereof, and into which a removable container (16) can be fitted.

The support (10) has a base portion (18) having a plurality of holes (20) through which mechanical fasteners such as stakes (26), nails (28), or screws (30) can be driven.

The removable container (16) further contains an upper rim (17) extending outwardly from a top portion (19) thereof and is adapted to engage a top surface rim (21) on the top surface (15) of the main body member (12), such that the removable container (16) is held in place therein.

The hollow center portion (14) can be used, as is, to put granules thereinto, or the removable container (16) can be put in when liquid is used. The removable container (16) has a small aperture (24) designed to allow for a liquid to drip drop by drop.

Alternatively, a sponge member (34) or an equivalent high absorbency material can be put inside the hollow center portion (14), The sponge member (34) (or equivalent) containing a liquid substance, as per the removable container (16), can be fitted.

Besides hunters, the block support (10) can also be used by farmers for their own livestock.

Figure 4A:
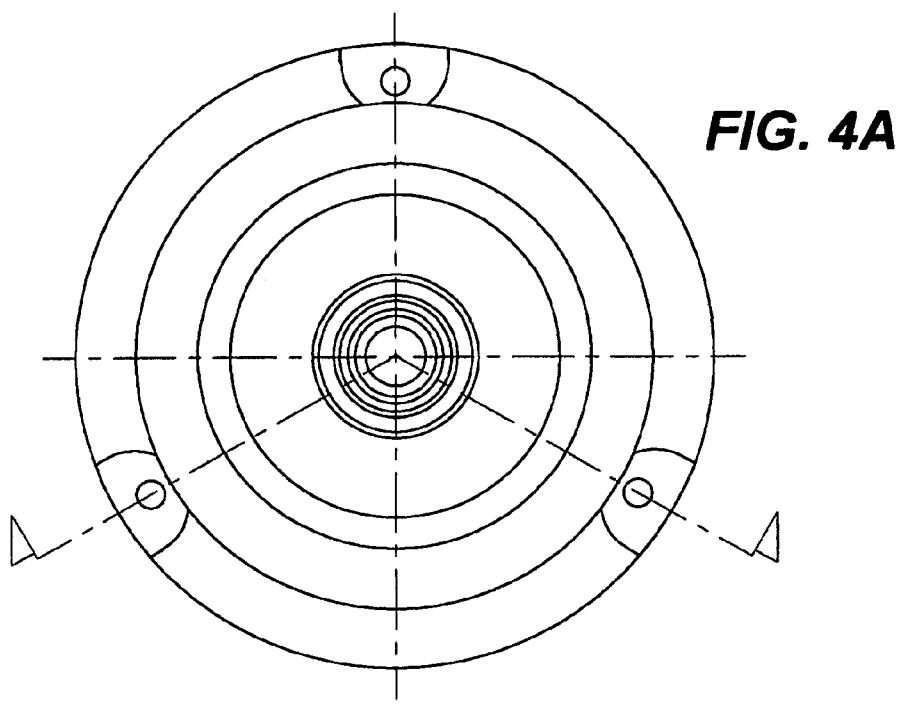
FIGS. 4a-b Top and cutaway views of an alternate embodiment.
Figure 4B:
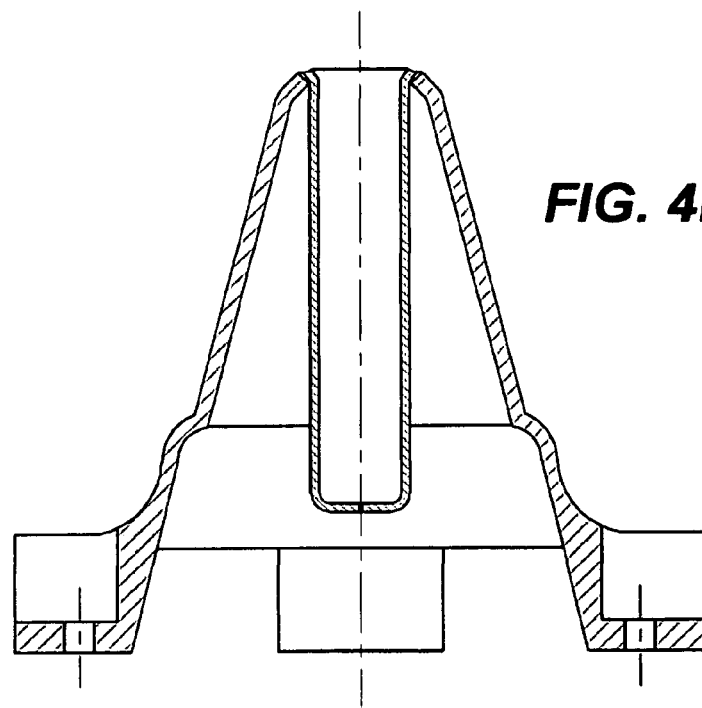
Figure 5B:
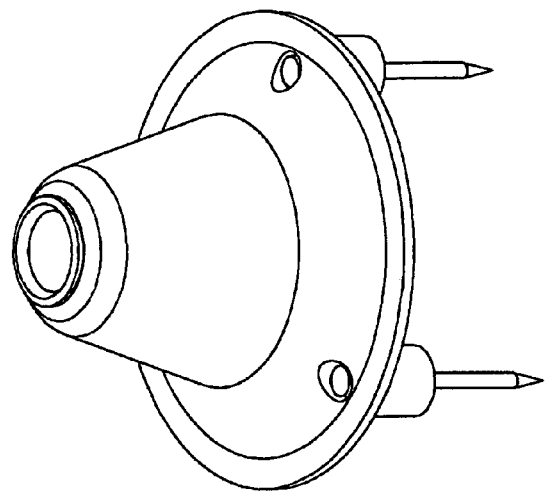
FIGS. 5a-b Exploded and isometric views of yet another embodiment.
Figure 5A:
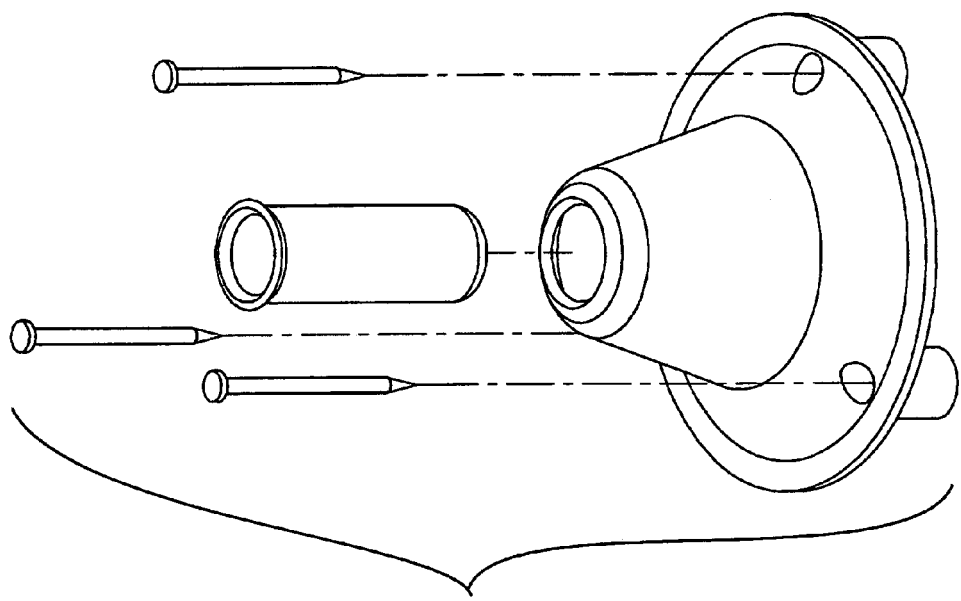
Figure 6A:
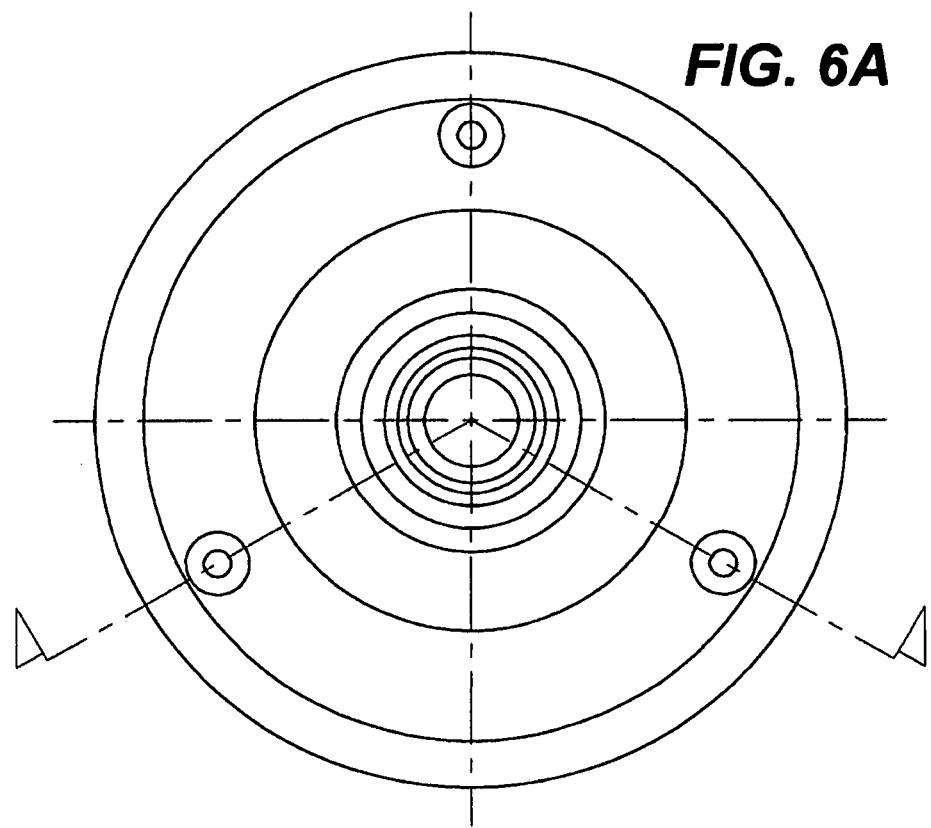
FIGS. 6a-b Top and cutaway views of yet another embodiment.
Figure 6B:
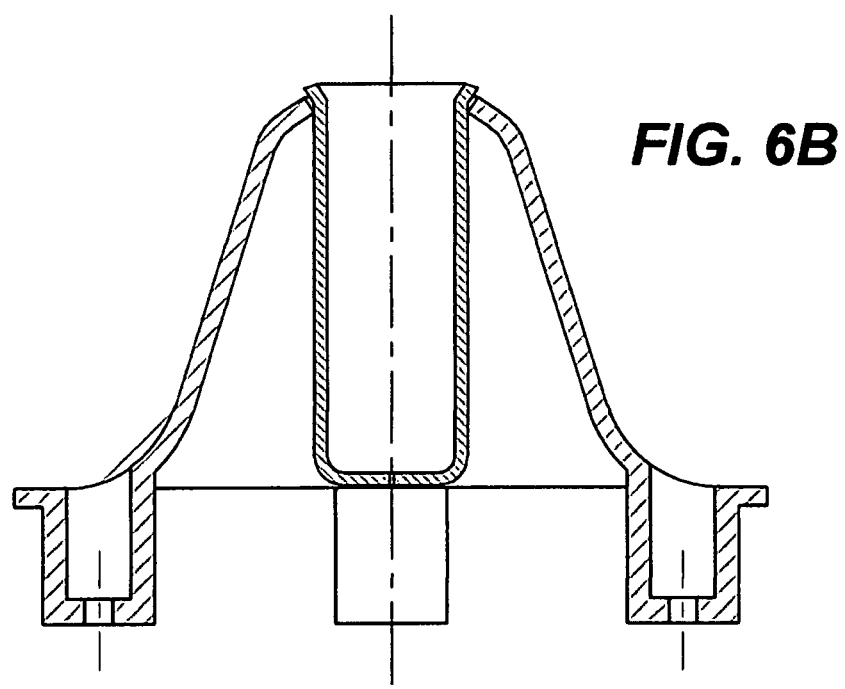
Figure 8A:
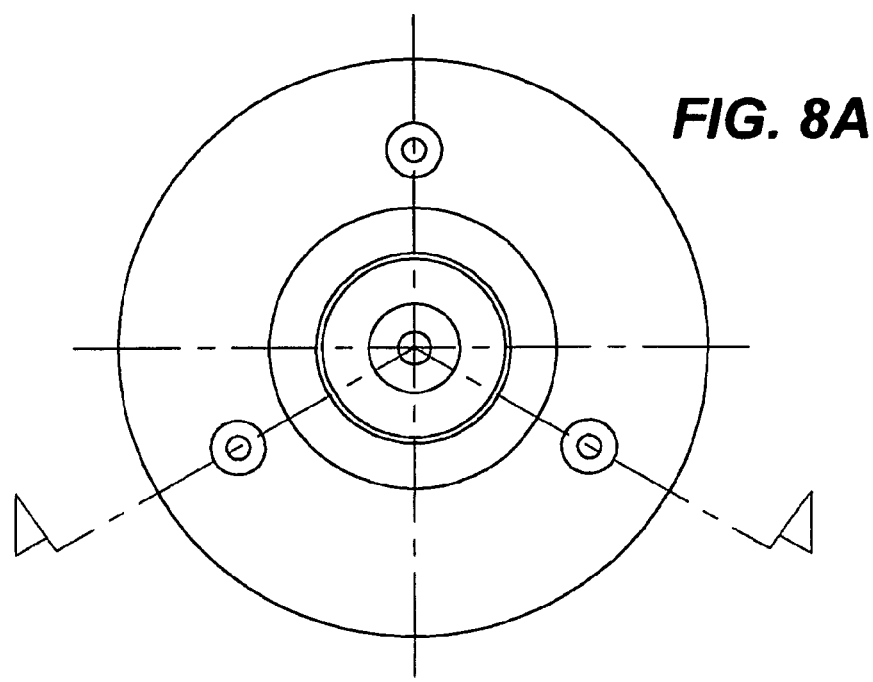
FIGS. 8a-b Top and cutaway views of still another embodiment.
Figure 8B:
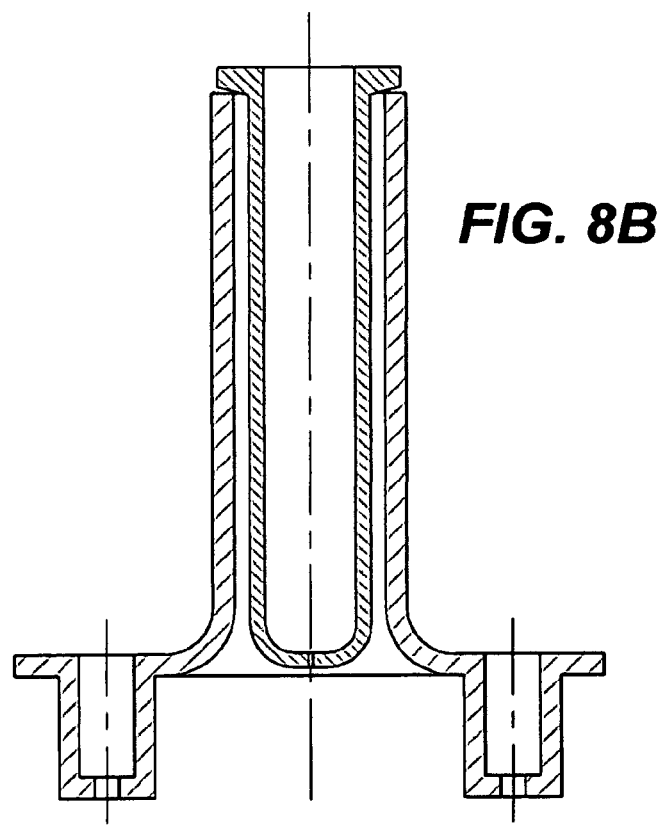

There are small variations in the embodiments, as shown in FIGS. 3 to 8 which fall within the scope of a single invention.

In use, after the support (10) has been secured onto a surface, granules or a liquid are put inside the hollow center portion (14). And then, a salt lick block (32) having a hollow central shaft is inserted over the main body member (12). Some types of salt lick blocks (32) are designed with such a hollow shaft. The bait attracts game by way of releasing specific aromas that have been shown to attract animals. They can be pheromone based or simply sweet in fragrance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A combination of a salt lick block and a salt lick block support comprising:
    a salt lick block formed and adapted to fit onto a salt lick block support; and
    a salt lick block support comprising a main body member having a hole in a top portion thereof, a hollow central portion adapted to hold a granular material therein, and a base portion extending outwardly from a lower section thereof and including a plurality of holes therethrough adapted to allow fasteners therein to securely hold said salt lick block support to a chosen surface; a plurality of fasteners adapted to extend through respective said plurality of holes and engage said chosen surface; and a removable container adapted to hold a liquid therein, has an opening in a top portion thereof, and is adapted to fit and be held in place within said hole in a top surface of said main body member, wherein said removable container further includes a small aperture in a bottom surface thereof that is adapted to allow said liquid to pass therethrough in a drop-by-drop fashion, such that said salt lick block can be placed securely upon said salt lick block support.

2. The combination of claim 1, wherein said salt lick block, said main body member, and said hollow central portion are formed in a conical shape.

3. The combination of claim 1, wherein said hole in said top surface of said main body member is formed in a circular shape; and wherein said removable container is formed in the shape of an elongated cylinder.

4. The combination of claim 1, wherein said removable container further contains an upper rim extending outwardly from a top portion thereof and is adapted to engage a rim of said hole in said top surface of said main body member, such that said removable container is held in place therein.

5. The combination of claim 1, wherein a liquid is placed within said removable container; and wherein said liquid is chosen from a group of liquids that have an odor that is adapted to attract animals.

6. The combination of claim 1, further comprising a granular material adapted to be placed within said hollow central portion of said main body member; wherein said granular material is chosen from a group of granular materials that have an odor that is adapted to attract animals.

7. The combination of claim 1, further comprising a sponge member adapted to be placed within said hollow central portion of said main body member; and wherein said sponge member contains a liquid substance therein having an odor that is adapted to attract animals.

* * * * *